US009442848B2

(12) United States Patent
Benhase et al.

(10) Patent No.: US 9,442,848 B2
(45) Date of Patent: *Sep. 13, 2016

(54) INCREASED DESTAGING EFFICIENCY BY SMOOTHING DESTAGING BETWEEN CURRENT AND DESIRED NUMBER OF DESTAGE TASKS

(75) Inventors: Michael T. Benhase, Tucson, AZ (US); Lokesh M. Gupta, Tucson, AZ (US); Roger G. Hathorn, Tucson, AZ (US); Sonny E. Williams, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 324 days.

This patent is subject to a terminal disclaimer.

(21) Appl. No.: 13/538,450

(22) Filed: Jun. 29, 2012

(65) Prior Publication Data
US 2013/0198752 A1 Aug. 1, 2013

Related U.S. Application Data

(63) Continuation of application No. 13/363,092, filed on Jan. 31, 2012.

(51) Int. Cl.
*G06F 9/46* (2006.01)
*G06F 9/455* (2006.01)
*G06F 12/08* (2016.01)
*G06F 12/12* (2016.01)

(52) U.S. Cl.
CPC ....... *G06F 12/0804* (2013.01); *G06F 12/0868* (2013.01); *G06F 12/121* (2013.01); *G06F 2212/1024* (2013.01); *G06F 2212/281* (2013.01); *G06F 2212/312* (2013.01); *G06F 2212/462* (2013.01)

(58) Field of Classification Search
None
See application file for complete search history.

(56) References Cited

U.S. PATENT DOCUMENTS

| 6,041,028 | A | 3/2000 | Quan et al. | |
|---|---|---|---|---|
| 6,385,673 | B1 | 5/2002 | DeMoney | |
| 8,437,098 | B2 | 5/2013 | Benhase et al. | |
| 2004/0139441 | A1* | 7/2004 | Kaburaki et al. | 718/107 |
| 2010/0174867 | A1* | 7/2010 | Gill et al. | 711/118 |
| 2012/0151140 | A1* | 6/2012 | Beardsley et al. | 711/118 |

(Continued)

FOREIGN PATENT DOCUMENTS

| CN | 1517869 A | 8/2004 |
|---|---|---|
| CN | 101221537 A | 7/2008 |
| JP | 6202814 A | 7/1994 |

(Continued)

OTHER PUBLICATIONS

English Translation of JP9044316.*

*Primary Examiner* — Eric C Wai
*Assistant Examiner* — Bradley Teets
(74) *Attorney, Agent, or Firm* — Griffiths & Seaton PLLC

(57) ABSTRACT

Techniques for increased destaging efficiency by smoothing destaging tasks to reduce long input/output (I/O) read operations are described. A method may comprise a processor device operable in the computing storage environment. The processor device destages tasks are calculated according to one of a standard time interval and a variable recomputed destaging task interval. The destaging of storage tracks between a desired number of destaging tasks and a current number of destaging tasks is smoothed according to the calculating.

6 Claims, 3 Drawing Sheets

(56) References Cited

U.S. PATENT DOCUMENTS

2013/0198751 A1* 8/2013 Benhase et al. .............. 718/102
2013/0198752 A1   8/2013 Benhase et al.

FOREIGN PATENT DOCUMENTS

| JP | 944316 A | 2/1997 |
|----|----------|--------|
| JP | 9212310 A | 8/1997 |

* cited by examiner

INCREASED DESTAGING EFFICIENCY BY SMOOTHING DESTAGING BETWEEN CURRENT AND DESIRED NUMBER OF DESTAGE TASKS

CROSS-REFERENCE TO RELATED APPLICATIONS

The present application is a Continuation of U.S. patent application Ser. No. 13/363,092, filed Jan. 31, 2012.

BACKGROUND OF THE INVENTION

1. Field of the Invention

The present invention relates in general computing systems, and more particularly to, systems and methods for increased destaging efficiency.

2. Description of the Related Art

In today's society, computer systems are commonplace. Computer systems may be found in the workplace, at home, or at school. Computer systems may include data storage systems, or disk storage systems, to process and store data. Contemporary computer storage systems are known to destage storage tracks from cache to long-term storage devices so that there is sufficient room in the cache for data to be written. When destaging the storage tracks, contemporary storage systems destage the storage tracks from each rank in the cache when the cache is becoming full or the global pressure factor is high. That is, storage tracks are destaged from each rank when the global pressure factor is high, even though some ranks in the cache may only be storing a small number of storage tracks with respect to the amount of storage space allocated to these ranks. Moreover, destaging tasks assist with starting the destaging of storage tracks to the storage systems.

SUMMARY OF THE INVENTION

When the required number of destaging tasks exceed the current amount of destaging task, the probability that a burst of destaging of the storage tracks increases resulting in long transaction responses for input/output (IO) operations for read operations. A need exists for reducing the bursting of the destaging of the storage tracks by smoothing the destaging process in the computing environment.

Various embodiments provide methods for increased destaging efficiency by smoothing destaging tasks to reduce long input/output (I/O) read operations. One method comprises calculating, by a processor device in a computing environment, the destaging tasks according to one of a standard time interval and a variable recomputed destaging task interval. The method further comprises smoothing the destaging of storage tracks between a desired number of destaging tasks and a current number of destaging tasks according to the calculating.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
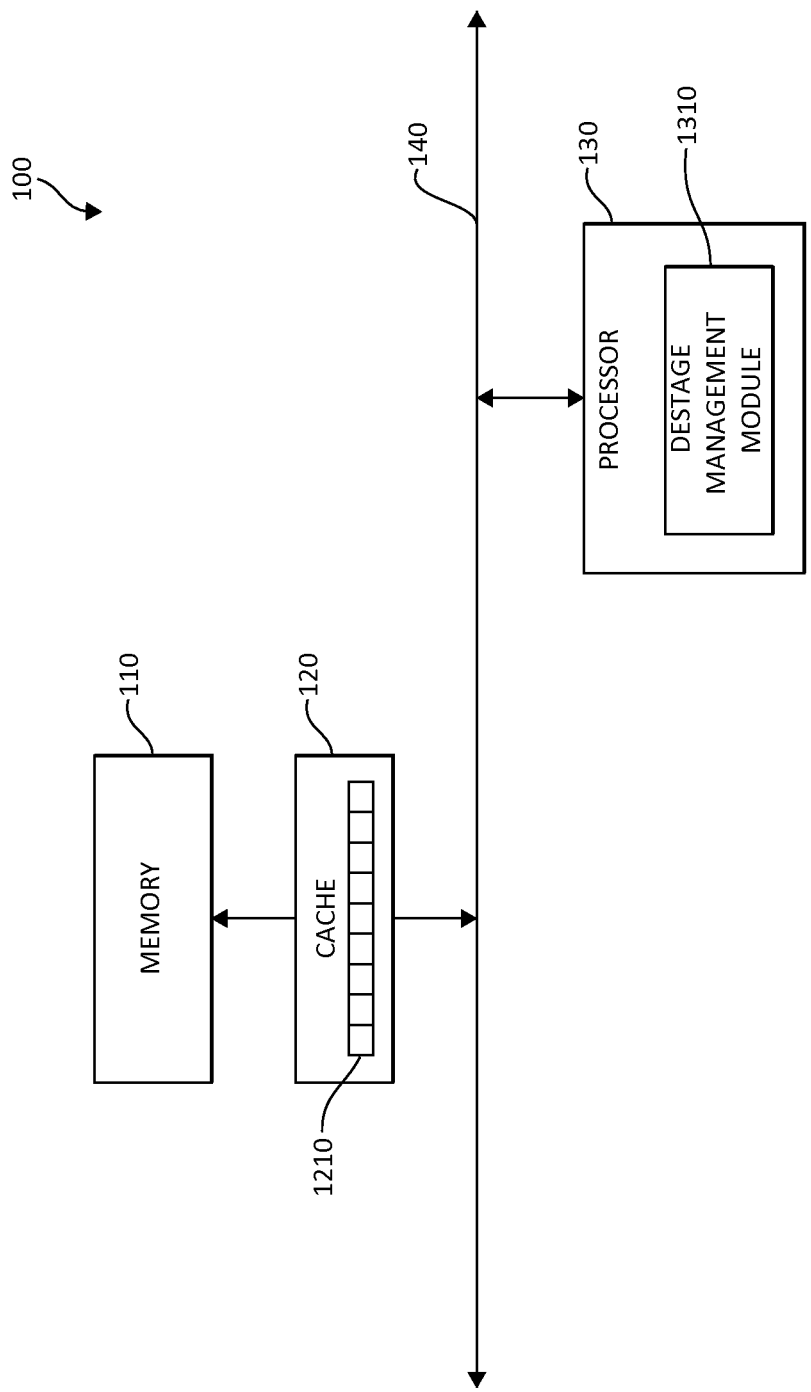
FIG. 1 illustrates is an exemplary block diagram showing a hardware structure for smoothing destaging tasks in which aspects of the present invention may be realized.

As mentioned previously, contemporary computer storage systems are known to destage storage tracks from cache to long-term storage devices so that there is sufficient room in the cache for data to be written. Wise Ordering for Writes (WOW), which are lists that are used for exploiting both temporal and spatial locality by ordering the list according to the storage location to which an associated task or request is directed, typically add a destaging task control blocks ("TCBs"), or simply "destaging tasks" one at a time. The destaging tasks are used to manage the movement of data within a data storage and retrieval system and between a host computer and the data storage and retrieval system. In other words, the destage TCBs are tasks that &stage tracks from a cache to storage (e.g., disk drives).

The destaging TCBs may be a command to start the destaging of the storage track. However, when there is a significant increase in destaging TCB's during a relatively short time period, the destaging process must "jump" to this new increased destaging TCB amount. For example, the destaging TCBs may go from four TCBs to 40 TCBs. The jump to this increased number is due to over half of the running ranks scanning sequentially written tracks. This jumping to the increased TCB number causes a burst of destaging of the storage tracks to a rank, thereby causing read operation to take longer during the bursts (e.g., a customer may experience long transaction responses of over 1 second every few minutes). With the bursts of destaging of the storage tracks to the ranks, drives are busy destaging in an area of the storage system (e.g., disks) and avoid seeking other regions where there may be read operations. In order to avoid this situation, a Command Aging Limit (CAL) timeout is used to force the drives to service the read operation after the timeout occurs. However, the CAL is set at 500 millisecond (MS), vet, even after the 500 MS, a transaction may perform multiple read/write operations that take over 1 second to perform.

Thus, when the required number of destaging tasks exceed the current amount of destaging tasks, the probability that a burst of destaging of the storage tracks increases resulting in long transaction responses for input/output (IO) operations for read operations. A need exists for reducing the bursting of the destaging of the storage tracks by smoothing the destaging process.

To address these inefficiencies, the mechanisms of the present invention seek to reduce the bursting of the destaging of the storage tracks by smoothing the destaging tasks resulting in fewer I/Os for read operation experiencing significant delay in processing. In order to achieve this objection, the present invention calculates the destaging tasks according to one of a standard time interval and a variable recomputed destaging task interval. The destaging of storage tracks between a desired number of destaging tasks and a current number of destaging tasks are smoothed according to the calculating. The actual (or current) number of destaging TCBs for a rank is the number of destaging tasks that are currently active on a rank. The desired number of destaging tasks (TCBs) for a rank is the number of destaging tasks (TCBs) that are needed for a rank based on non-volatile storage (NVS) (e.g., non-volatile memory (NVM)) occupancy for the rank. Thus, rather than instantaneously jumping from the current number of destaging tasks to the required number of destaging tasks, the smoothing process allows for ramping up and/or ramping down of the destaging tasks for the destaging of the storage tracks. Also, the destage tasks are calculated (computed) more often when the difference between the current destage TCBs and the required destage TCBs (the difference being a delta value) is higher than a predetermined delta value.

The smoothing process performed by the computing system increases the rate of computing the current number of destaging task when the difference between the current number of destaging tasks and the required number of destaging task is larger. Rather than experiencing a bursting of destaging tasks, the computing system increases the rate in which the current destaging tasks are calculated. This allows for the incrementing and/or decrementing of the destaging tasks to be accelerated. By increasing the acceleration rate of incrementing and decrementing of the current number of destaging task for reaching the required number of the destaging tasks, the computing system reaches the required number of destaging task in a smooth, controlled manner without experiencing the bursting. In so doing, the longer transaction responses for I/Os of read operations are significantly reduced. The computing environment's processors and hardware components may be released and freed up from the destaging of storage tracks and service other I/O requests (e.g., the computing system drives are freed up at an accelerated pace for servicing and responding to I/O read operations that previously where experiencing significant delays.) Hence, the computing environment experiences increased efficiency for the user.

Turning to FIG. 1, a block diagram of one embodiment of a system 100 for smoothing destaging tasks. At least in the illustrated embodiment, system 100 comprises a memory 110 coupled to a cache 120 and a processor 130 via a bus 140 (e.g., a wired and/or wireless bus).

Memory 110 may be any type of memory device known in the art or developed in the future. Examples of memory 110 include, but are not limited to, an electrical connection having one or more wires, a portable computer diskette, a hard disk, a random access memory (RAM), an erasable programmable read-only memory (EPROM or Flash memory), an optical fiber, a portable compact disc read-only memory (CD-ROM), an optical storage device, a magnetic storage device, or any suitable combination of the foregoing. In the various embodiments of memory 110, storage tracks are capable of being stored in memory 110. Furthermore, each of the storage tracks can be destaged to memory 110 from cache 120 when data is written to the storage tracks.

Cache 120, in one embodiment, comprises a write cache partitioned into one or more ranks 1210, where each rank 1210 includes one or more storage tracks. Cache 120 may be any cache known in the art or developed in the future.

During operation, the storage tracks in each rank 1210 are destaged to memory 110 in a foreground destaging process after the storage tracks have been written to. That is, the foreground destage process destages storage tracks from the rank(s) 1210 to memory 110 while a host (not shown) is actively writing to various storage tracks in the ranks 1210 of cache 120. Ideally, a particular storage track is not being destaged when one or more hosts desire to write to the particular storage track, which is known as a destage conflict. For smoothing the destaging tasks for destaging the storage tracks in the ranks 1210, a processor 130 is configured to execute a method for smoothing destaging tasks.

In various embodiments, processor 130 comprises or has access to a destage management module 1310, which comprises computer-readable code that, when executed by processor 130, causes processor 130 to perform the method for smoothing destaging tasks. In the various embodiments, processor 130 is configured to calculate the number of destaging tasks according to either a standard time interval and a variable recomputed destaging task interval.

In various other embodiments, processor 130 is configured to smooth the destaging of storage tracks between a desired number of destaging tasks and a current number of destaging tasks according to the calculated number of destaging tasks according to either a standard time interval and/or a variable recomputed destaging task interval.

In various other embodiments, processor 130 is configured to perform the smoothing based upon the calculating the destaging tasks according to the variable recomputed destaging task interval when a delta value between the desired number of destaging tasks and the current number of destaging tasks is greater than a predetermined delta value.

In various other embodiments, processor 130 is configured to perform the smoothing based upon the calculating the destaging tasks according to the standard time interval when a delta value between the desired number of destaging tasks and the current number of destaging tasks is less than a predetermined delta value.

In various other embodiments, processor 130 is configured to either ramp up and/or ramp down the smoothing between the desired number of destaging tasks and the current number of destaging task.

In various other embodiments, processor 130 is configured to either decrement the current number of destaging tasks by a value of one, if greater than the desired number of destaging tasks and/or increment the current number of destaging tasks by a value of one, if less than the desired number of destaging tasks. Subsequent to either decrementing or incrementing, the processor 130 is configured to recalculate the current number of destaging tasks after reaching either the standard time interval and the variable recomputed destaging task interval that is selected for the calculating.

In one embodiment, each rank 1210 is allocated the same predetermined amount of storage space in cache 120. In another embodiment, at least two ranks 1210 are allocated different predetermined amounts of storage space in cache 120. In still another embodiment, each rank 1210 is allocated a different predetermined amount of storage space in cache 120. In each of these embodiments, each predetermined amount of storage space in cache 120 is not to exceed a predetermined maximum amount of storage space.

In various embodiments, processor 130 is configured to allocate the predetermined maximum amount of storage space on a percentage basis. In one embodiment, the predetermined maximum amount of storage space allocated to a respective rank 1210 is in the range of about one percent to about twenty-five percent (1%-50%) of the total storage capacity of cache 120. In another embodiment, the predetermined maximum amount of storage space allocated to a respective rank 1210 is twenty-five percent (25%) of the total storage capacity of cache 120.

In various other embodiments, processor 130 is configured to allocate the predetermined maximum amount of storage space on a storage track basis. That is, each rank 1210 is limited to a predetermined maximum number of storage tracks, which can vary from rank to rank.

Processor 130, in various embodiments, is configured to monitor each rank 1210 in cache 120 and determine the amount of storage tracks each respective rank 1210 is storing with respect to its allocated amount of storage space in cache 120. In one embodiment, processor 130 is configured to determine the amount of storage tracks in each respective rank 1210 on a percentage basis. That is, processor 130 is configured to monitor each rank 1210 and determine the percentage each respective rank 1210 is using to store storage tracks with respect to the individual allocations of the total storage space in cache 120.

In another embodiment, processor 130 is configured to determine the number of storage tracks in each respective rank 1210. Specifically, processor 130 is configured to monitor each rank 1210 and determine the number of storage tracks each respective rank 1210 is using to store storage tracks with respect to the individual allocations of the total storage space in cache 120.

Processer 130, in various embodiments, is configured to destage storage tracks from each respective rank 1210 until a predetermined minimum amount of storage space remains in each respective rank 1210 with respect to its predetermined allocated amount of storage space in cache 120, and then cease to or no longer destage storage tracks from ranks 1210 that are using less than or equal to the predetermined minimum amount of storage space. In one embodiment, processor 130 is configured to destage storage tracks from each rank 1210 until a predetermined percentage (e.g., thirty percent (30%)) of the predetermined amount of storage space in cache 120 is reached. In another embodiment, processor 130 is configured to destage storage tracks from each rank 1210 until a predetermined minimum number of storage tracks are reached.

For example, in an embodiment that includes ten (10) ranks 1210 in which each rank 1210 is allocated 10 percent (10%) of the total storage space of cache 120 and the predetermined minimum amount of storage tracks is thirty percent (30%), processor 130 will continue to destage storage tracks from each rank 1210 that includes more than three percent (3%) of the total storage capacity of cache 120 (i.e., 10%×30%=3%). Once a particular rank 1210 has reached the three percent threshold, processor 130 will cease to or no longer destage storage tracks from the particular storage track until the particular rank 1210 is using more than the predetermined amount of storage tracks is (i.e., three percent of the total storage capacity of cache 120 in this example).

Processor 130, in various embodiments, is configured to utilize a formula to determine the number of destage tasks to utilize when destaging storage tracks from each respective rank 1210. In the various embodiments, the formula is based on the global pressure factor of cache 120 as it relates to each respective rank 1210. That is, the number of destage tasks utilized to destage storage tracks from each respective rank 1210 is proportional to the amount of its allocated storage space each respective rank 1210 is multiplied by the global pressure factor, which is a factor determined by a collective percentage of the total amount of storage space in cache 120 being utilized by ranks 1210.

In one embodiment, the formula includes a predetermined maximum number destage tasks (e.g., forty (40) destage tasks) that is utilized when a particular rank 1210 is utilizing a large amount of its allocated storage space and the global pressure factor is high. In another embodiments, the formula includes a default of zero (0) destage tasks that is utilized when a particular rank 1210 is utilizing an amount of storage space less than or equal to the predetermined minimum amount with respect to its allocated amount of storage space in cache 120.

Figure 2:
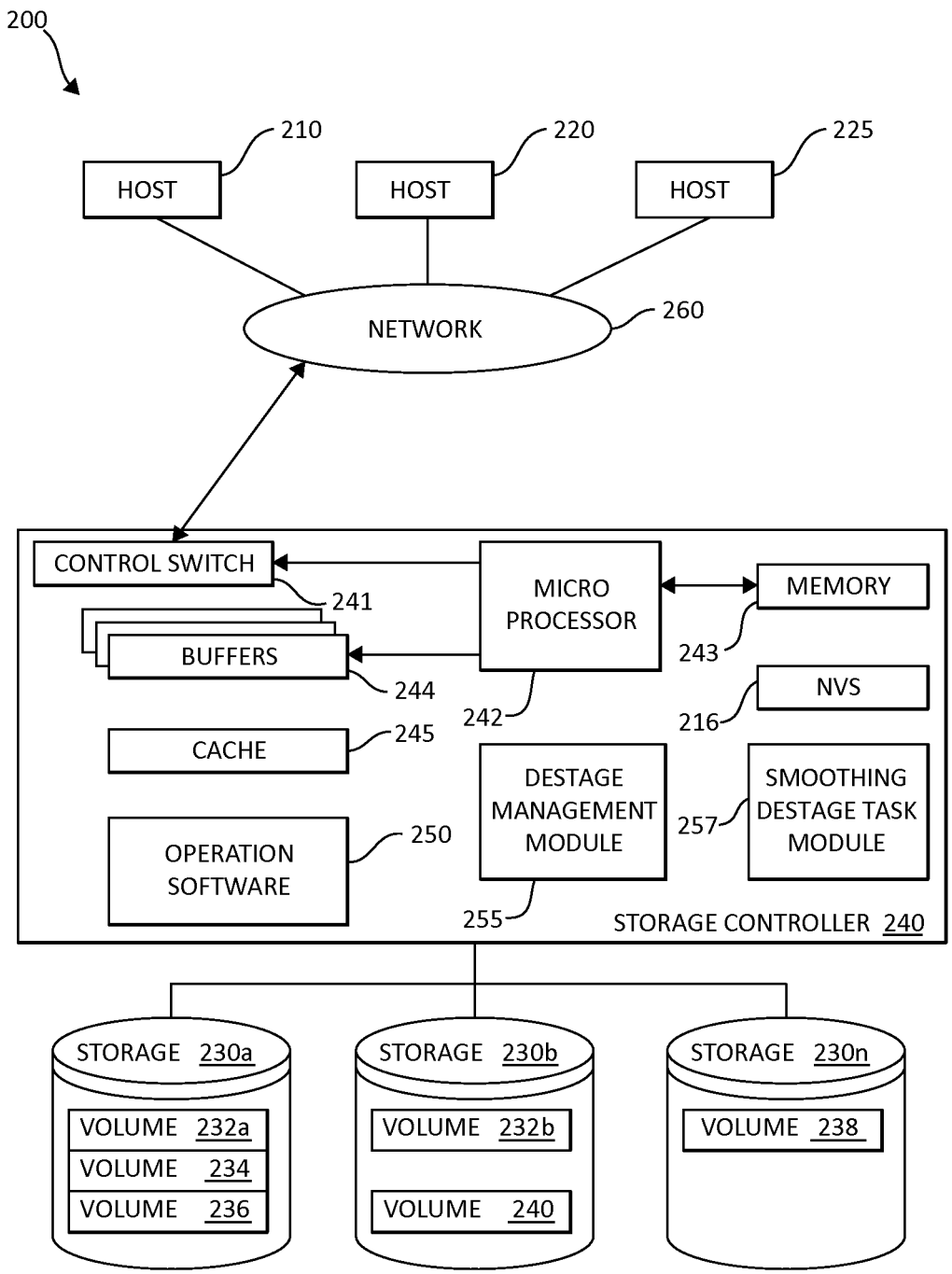
FIG. 2 is an exemplary block diagram showing a hardware structure of a data storage system in a computer system according to the present invention in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. A Network (e.g., storage fabric) connection 260 may be a fibre channel fabric, a fibre channel point-to-point link, a fibre channel over ethernet fabric or point to point link, a FICON or ESCON I/O interface. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Moreover, given the use of the storage fabric network connection 260, additional architectural configurations may be employed by using the storage fabric 260 to connect multiple storage controllers 240 together with one or more cluster hosts 210, 220, and 225 connected to each storage controller 240.

In some embodiments, the system memory 243 of storage controller 240 includes operation software 250 and stores program instructions and data which the processor 242 may access for executing functions and method steps associated with executing the steps and methods of the present invention. As shown in FIG. 2, system memory 243 may also include or be in communication with a cache 245, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 may be implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

The storage controller 240 may include a destage management module 255 and a smoothing destage task module 257. The destage management module 255 and smoothing destage task module 257 may be one complete module functioning simultaneously or separate modules. The destage management module 255 and smoothing destage task module 257 may have some internal memory (not shown) in which the destaging algorithm may store unprocessed, processed, or "semi-processed" data. The destage management module 255 and smoothing destage task module 257 may work in conjunction with each and every component of the storage controller 240, the hosts 210, 220, 225, and other storage controllers 240 and hosts 210, 220, and 225 that may be remotely connected via the storage fabric 260. Both the destage management module 255 and smoothing destage task module 257 may be structurally one complete module or may be associated and/or included with other individual modules. The destage management module 255 and smoothing destage task module 257 may also be located in the cache 245 or other components of the storage controller 240.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, cache 245 for temporarily storing (buffering) data, and buffers 244 for assisting the cache 245 to read and write data, a control switch 241 for controlling a protocol to control data transfer to or from the destage management module 255 and the smoothing destage task module 257 in which information may be set. Multiple buffers 244 may be implemented to assist with the methods and steps as described herein.

In one embodiment, the cluster hosts/nodes, 210, 220, 225 and the storage controller 240 are connected through a network adaptor (this could be a fibre channel) 260 as an interface i.e., via a switch called "fabric." In one embodiment, the operation of the system shown in FIG. 2 may be described as follows. The microprocessor 242 may control the memory 243 to store command information from the cluster host/node device (physical or virtual) 210 and information for identifying the cluster host/node device (physical or virtual) 210. The control switch 241, the buffers 244, the cache 245, the operating software 250, the microprocessor 242, memory 243, NVS 216, destage management module 255, and the smoothing destage task module 257 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

Figure 3:
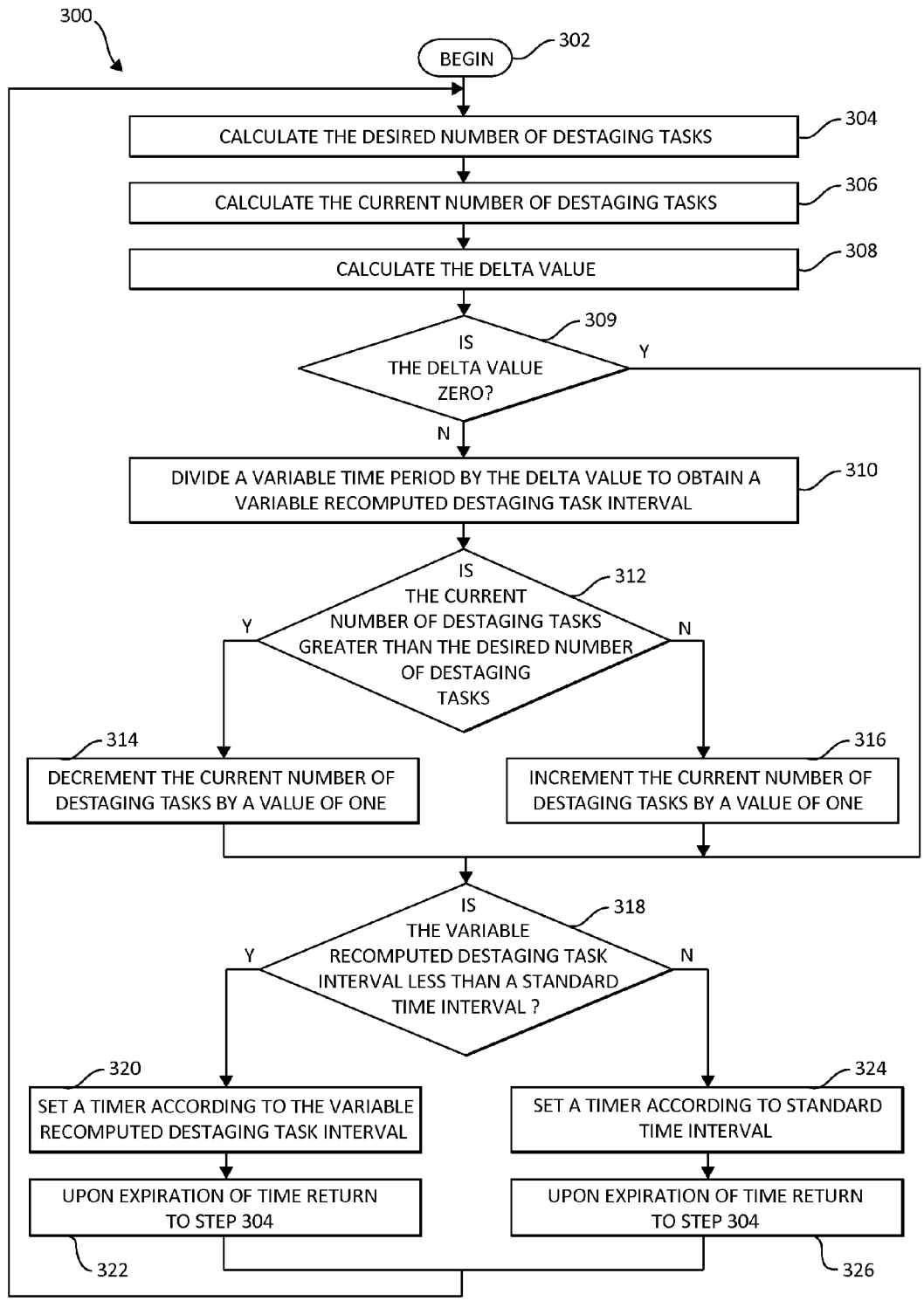
FIG. 3 illustrates an exemplary method for increased destaging efficiency by smoothing the destaging tasks.

Turning to FIG. 3, a flowchart illustrates an exemplary method 300 for smoothing the destaging task is depicted. The method 300 begins (step 302). The desired number of destaging tasks is calculated (step 304). The current number of destaging tasks is calculated (step 306). A delta value, which is the difference between the desired and the current number of destaging tasks, is calculated (step 308). The method 300 will then determine if the calculated delta value is zero (step 309). If calculated delta value is zero, the method 300 may skip to step 318, which determines if the variable recomputed destaging task interval is less than a standard time interval. If the calculated delta value is not zero, the method 300 may divide a variable time period, obtained by historical data (or other experimental data obtained relating to the destaging process), by the delta value for computing a variable recomputed destaging task interval (step 310). The variable recomputed destaging task interval is a time period equal to a variable time period divided by the delta value.

Next, the method 300 may determine if the current number of destaging tasks is greater than the desired number of destaging tasks (step 312). If yes, the method 300 may decrement the current number of destaging tasks by a value of one (step 314). If no, the method 300 may increment the current number of destaging tasks by a value of one (step 316). It should be noted that the variable recomputed destaging task interval may always be used if the computed delta value is larger than a predetermined delta value. The delta value applies in either direction (e.g., increasing or decreasing). For example, if the predetermined delta value is 4, and if the calculated delta value is 8, the variable recomputed destaging task interval is used. If the variable time period is equal to 2 and the calculated delta value is 8, the variable recomputed destaging task interval would be 250 milliseconds (MS) (e.g., $2/8=0.25$). If the variable time period is equal to 2 and the calculated delta value is 16, the variable recomputed destaging task interval would be 125 MS. If the variable time period is equal to 2 and the calculated delta value is a max delta value of 40, the variable recomputed destaging task interval would be 50 MS. However, if the calculated delta value is only 2, than standard time interval will be used because the calculated delta value is less than the predetermined delta value.

Next, the method 300 may determine if the variable recomputed destaging task interval is less than a standard time interval (e.g., which value is a minimum value between the two time intervals) (step 318). If yes, the method 300 may set a timer according to the variable recomputed destaging task interval (step 320). The method 300 returns to step 304 upon the expiration of the timer (step 322). If the standard time interval is less than the variable recomputed destaging task interval, a timer is set according to standard time interval (step 324). The method 300 returns to step 304 upon the expiration of the timer (step 326). It should be noted that the timer may be reset and the recalculation is continuously performed at the expiration of the time period by returning to step 304. In other words, the recalculation is constantly being performed based upon the variable recomputed destaging task interval or the standard time interval (e.g., if the variable recomputed destaging task interval is 50 MS, the recalculation occurs every 50 MS). The method may continue this process repeatedly.

By way of example only, consider the following scenario for increased destaging efficiency by smoothing the destaging tasks. First, assume that the current number of destaging tasks is at a value of 20, but the desired number of destaging tasks is equal to the value of 40. Assume also, that a standard time interval is measured at a half of a second (e.g., 0.5 seconds or 500 milliseconds). Rather than jumping straight to the desired number of destaging tasks, which is now at 40, the delta value between the desired and the current number of destaging tasks is first calculated. This delta value would be 20 (e.g., 40 minus 20 is equal to 20). Previously, over an arbitrary or fixed period of time, a variable time period would have been obtained from either historical data or some other experimental data obtained relating to the destaging process. For purposes of this example, it is assumed that this variable time period is equal to 1 second. Using this variable time period and the calculated delta value, a variable recomputed destaging task interval is calculated by dividing the variable time period (1 second) by the delta value (20) yielding a result of 50 MS (e.g., ½₀=0.05 seconds or 50 milliseconds). Now, if the current number of destaging tasks is greater than the desired number of destaging tasks, the mechanisms of the present invention will decrement the current number of destaging tasks by a value of one. If the current number of destaging tasks is less than the desired number of destaging tasks, the mechanisms of the present invention will increment the current number of destaging tasks by a value of one.

At this point, having previously determined that the variable recomputed destaging task interval (50 MS) is smaller than the standard time interval (500 MS), a timer is set for 50 MS. After reaching the 50 MS, the current number of destaging tasks are recalculated and will continue to recalculate every 50 MS, which is 10 times (10×) faster than the 500 MS standard time interval. In the event that it is determined that the standard time interval is less than the variable recomputed destaging task interval, the timer is set according to the standard time interval (for example, the 500 MS) and the recalculating of the current number of destaging tasks occurs every 500 MS. This process then continues as long as there are destaging tasks to perform for the destaging of storage tracks. Thus, by recalculating the current number of destaging tasks at short or faster time intervals, the mechanisms of the present invention ramp up and/or ramp down the incrementing and/or the decrementing of the desired number of destaging tasks and the current number of destaging tasks.

The computer system that is using the method described performs the smoothing at a controlled pace for destaging of storage tracks. This smoothing process eliminates the bursting of destaging tasks for destaging of storage tracks and causes fewer long I/Os for read operations by increasing the computing rate of the current number of destaging task when the difference between the current number of destaging tasks and the required number of destaging task is larger. This allows for the incrementing and/or decrementing of the destaging tasks to be accelerated. By increasing the acceleration rate of incrementing and decrementing of the current number of destaging task for reaching the required number of the destaging tasks, the computing system reaches the required number of destaging task in a smooth, controlled manner. The bursting is now eliminated.

In so doing, the longer transaction responses for I/Os of read operations are significantly reduced. The computing environment's processors and hardware components may be released and freed up from the destaging of storage tracks and service other I/O requests (e.g., the computing system drives are freed up at an accelerated pace for servicing and responding to I/O read operations that previously where experiencing significant delays.) Hence, the computing environment experiences increased efficiency for the user.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A method for increased destaging efficiency by smoothing destaging tasks to reduce long input/output (I/O) read operations by a processor device in a computing environment, the method comprising:

calculating a current number of the destaging tasks, the current number of destaging tasks being a number of destaging task control blocks (TCBs) active on a rank of a memory;

calculating a desired number of destaging tasks, the desired number of destaging tasks being a number of TCBs needed for the rank based upon a non-volatile storage (NVS) occupancy for the rank;

smoothing the destaging of the destaging tasks between the desired number of the destaging tasks and the current number of the destaging tasks by expediting the calculating of the current number of the destaging tasks and the desired number of the destaging tasks, according to either a duration of time or a variable recomputed destaging task number, for reaching the desired number of the destaging tasks by decrementing the current number of destaging tasks or incrementing the current number of destaging tasks; and smoothing according to the time interval when a delta value, which is the difference between the desired number of destaging tasks and the current number of destaging tasks, is less than a predetermined delta value;

wherein the variable recomputed destaging task interval is a time period equal to a variable time period obtained by historical data relating to the destaging of the storage tracks divided by a delta value between the desired number of destaging tasks and the current number of destaging tasks.

2. The method of claim 1, further including, performing the smoothing according to the variable recomputed destaging task number when a delta value, which is the difference between the desired number of destaging tasks and the current number of destaging tasks, is greater than the predetermined delta value.

3. The method of claim 1, further including, utilizing the current number of destaging tasks to destage a plurality of storage tracks.

4. The method of claim 1, further including
decrementing the current number of destaging tasks by a value of one if greater than the desired number of destaging tasks, and
incrementing the current number of destaging tasks by a value of one if less than the desired number of destaging tasks.

5. The method of claim 4, further including, upon performing one of the decrementing and the incrementing, recalculating the current number of destaging tasks after reaching one of the time interval and the variable recomputed destaging task number.

6. The method of claim 1, further including, in conjunction with the calculating, performing one of:
utilizing a formula to determine the current number of destaging tasks to utilize to destage storage tracks, the current number of destaging tasks based on the current amount of storage tracks in the cache, and
utilizing the formula to determine a desired number of destaging tasks.

* * * * *